United States Patent [19]
Villena et al.

[11] Patent Number: 5,145,922
[45] Date of Patent: Sep. 8, 1992

[54] OLEFIN POLYMERIZATION CATALYSTS

[75] Inventors: Alan Villena; Ronald P. C. van Gaalen; John C. Chadwick, all of Amsterdam; Theodorus K. Jurriens, Zaltbommel, all of Netherlands

[73] Assignee: Shell Research Limited, United Kingdom

[21] Appl. No.: 736,214

[22] Filed: Jul. 26, 1991

Related U.S. Application Data

[62] Division of Ser. No. 599,031, Oct. 17, 1990, Pat. No. 5,081,087.

[30] Foreign Application Priority Data

Nov. 16, 1989 [GB] United Kingdom ............... 8925945

[51] Int. Cl.$^5$ ............................................ C08F 4/654
[52] U.S. Cl. .................................. 526/124; 526/125; 502/104
[58] Field of Search ................................ 526/124, 125

[56] References Cited

FOREIGN PATENT DOCUMENTS 19330 11/1980 European Pat. Off. .
45977 2/1982 European Pat. Off. .
1559194 1/1980 United Kingdom .

Primary Examiner—Patrick P. Garvin

[57] ABSTRACT

A process for preparing an olefin polymerization catalyst which comprises halogenating a magnesium-di-(3- or 4-halo- or 3- or 4-$C_1$ to $C_8$ alkoxy-phenoxide) with a halide of tetravalent titanium in the presence of a halohydrocarbon, recovering the solid reaction product from the reaction mixture and combining the solid reaction product with an organo aluminium compound and an electron donor.

5 Claims, No Drawings

OLEFIN POLYMERIZATION CATALYSTS

This is a divisional of copending application Ser. No. now U.S. Pat. No. 5,081,087.

The present invention is concerned with a process for preparing olefin polymerization catalyst comprising a magnesium halide support.

From EP-19330 it is known to prepare solid olefin polymerization catalyst components by halogenating magnesium-alkoxides or -phenoxides with a titanium tetrahalide in the presence of a liquid halohydrocarbon and contacting the halogenated reaction product with a tetravalent titanium compound such as titanium tetrachloride. Comparative experimental information included in this patent specification shows the second contacting with titanium halide to be essential for obtaining an attractive performance of the solid catalyst component, both in terms of polymer yield and polymer isotacticity.

Surprisingly it has now been found that by carefully selecting a single substituent of the right type and in the right position in the phenoxy moiety of the magnesium starting compound, an attractive polymer yield and isotacticity can also be obtained when omitting the second contacting with titanium halide. An attractive performance appeared achievable when the phenoxy moiety carries an alkoxy or a halo substituent at the 3-position, whilst, for example, 2-alkoxy, 4-alkoxy 3-alkyl and 3,5-dialkyl substituents gave unsatisfactory results. Next to the saving of a process-step in the process for preparing the solid catalyst component the invention also has the advantage of reducing the amount of titanium-halide waste stream, thus facilitating the working-up and recycling thereof.

Another advantage of the solid catalyst components of this invention is that they may have a reduced decay-rate as compared to solid components prepared from unsubstituted magnesium phenoxide starting materials. Catalyst decay is the phenomenon discussed by L. Luciani in Angew. Makromol. Chemie, 94 (1981), p. 63–89, FIGS. 14 and 15.

The invention provides a process for preparing a solid catalyst component which comprises halogenating a magnesium-di(3- or 4-halo- or 3- $C_1$ to $C_8$ alkoxyphenoxide) with a halide of tetravalent titanium in the presence of a halohydrocarbon and recovering the solid product from the reaction mixture.

The invention also provides a process for preparing an olefin polymerization catalyst which comprises halogenating a magnesium-di-(3-halo- or 3-$C_1$ to $C_8$ alkoxyphenoxide) with a halide of tetravalent titanium in the presence of a halohydro-carbon, recovering the solid reaction product from the reaction mixture and combining the solid reaction product with an organo aluminium compound and an electron donor.

Preferred magnesium compounds to be employed in the processes of this invention are magnesium-di-(3-$C_1$ to $C_8$ alkoxy-phenoxides). More preferred are those magnesium phenoxides in which the single meta-substituent is chlorine, methoxy, ethoxy, n-propoxy, isopropoxy, and iso-butoxy. The methoxy substituent is most preferred.

Suitable halohydrocarbons are carbon tetrachloride, dichloro ethane, chloroform, monochlorobenzene, dichlorobenzene, monochlorobutane and the like. Mono- and dichlorobenzene are most preferred.

In the halogenation with a halide of tetravalent titanium, the magnesium compounds are preferably reacted to form a magnesium halide in which the atomic ratio of halogen to magnesium is at least 1.2/1. Better results are obtained when the halogenation proceeds more completely, i.e. yielding magnesium halides in which the atomic ratio of halogen to magnesium is at least 1.5/1. The most preferred reactions are those leading to reaction products in which the halogen to magnesium ratio is at least 1.75. Such halogenation reactions are suitably effected by employing a molar ratio of magnesium compound to titanium halogenation agent of from 0.0005:1 to 2:1, preferably from 0.01:1 to 1:1. The halogenation reactions are preferably conducted in the additional presence of an electron donor. An inert hydrocarbon diluent or solvent may also be present.

Suitable halides of tetravalent titanium include aryloxy or alkoxy-di- and trihalides, such as dihexanoxy-titanium dichloride, diethoxy-titanium dibromide, isopropoxy-titanium tri-iodide and ethoxytitanium trichloride, and titanium tetrahalides. The tetrahalides are preferred; most preferred is titanium tetrachloride.

The halogenating by the halide of tetravalent titanium is most suitably carried out at a temperature of from 60° C. to 136° C. for 0.1–6 hours. Particularly preferred contacting temperatures are from 70° C. to 120° C. and the most preferred contacting periods are 0.5 to 3.5 hours. The reaction normally proceeds under formation of a solid reaction product which is isolated from the liquid reaction medium by filtration, decantation or another suitable method and which may be subsequently washed with an inert hydrocarbon diluent, such as n-hexane, iso-octane or toluene, to remove any unreacted material, including physically absorbed halohydrocarbon.

Suitable electron donors to be employed in the solid catalyst component are alkyl esters of carboxylic acids, in particular of aromatic acids, such as ethyl and methyl benzoate, ethyl p-methoxy benzoate and ethyl p-ethoxy benzoate, dimethyl adipate, diisobutyl phthalate and di-n-butyl fumarate Ketones, phenols, amines, amides, phosphines and alcoholates can also be used as electron donors, as well as other compounds disclosed in GB-A 1389890, GB-A 1559194 and EP-A 45977.

As stated hereinbefore it is not essential to contact the solid catalyst component with titanium halide prior to combining it with the organo aluminium compound and an electron donor. Thus, without performing the second contacting of the catalyst component with titanium halide a catalyst will be obtained with attractive performance. However, one may chose to perform this second contacting in order to further improve the performance of the solid catalyst component in the polymerisation of alkenes.

For the polymerization of alkenes the solid catalyst component is employed in conjunction with an organoaluminium compound, preferably a trialkyl aluminium compound. These co-catalysts are complexed with an electron donor which may be any one of the electron donors set out hereinbefore. Thus, suitable electron donors are esters of carboxylic acids, particularly aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate and sterically hindered amines, e.g. 2,2,6,6-tetramethyl piperidine. Other suitable electron donors are organic silicon compounds including alkoxysilanes and acyloxysilanes of the general formula $S^1{}_nSi(OS^2)_{n-}$ where n is between zero and three, $S^1$ is a hydrocarbon group or a halogen atom and $S^2$ is a hydrocarbon group. Specific examples include trimethylmethoxy silane, triphenylethoxy silane, dimethyldimethoxy silane, phenethyltriethoxy silane and phenyltrimethoxy silane. Suitably n is one or two and $S^1$ and $S^2$ are the same or different alkyl groups. The donor used as complexing agent in the catalyst may be the same as or different from the donor used for preparing the titanium containing constituent. Preferred complexing agents are p-ethoxy ethyl benzoate, ethyltriethoxy silane and diethyldimethoxy silane.

The organoaluminium compound to be employed as cocatalyst may be chosen from any of the known activators in olefin polymerization catalyst systems comprising a titanium halide but is most suitably free of halogens. While trialkylalumium compounds, dialkylalumium halides and dialkylalumium alkoxides may be used, trialkylalumium compounds are preferred, particularly those wherein each of the alkyl groups has to 6 carbon atoms, e.g. triethylaluminium, tri-n-propylaluminium, triisobutylaluminium, triisopropylaluminium and dibutyl-n-amylaluminium.

Preferred proportions of electron donor reacted with organoaluminium compound are from 0.005 to 1.5, particularly from 0.1 to 0.8, calculated as mol per mol aluminium compound. Preferred proportions, calculated as mol per mol Ti, are from 0.1 to 100, particularly from 0.5 to 50.

Proportions of electron donor contained in the solid catalyst component, calculated as mol per mol of magnesium, are suitably from 0.01 to 10, e.g. from 0.05 to 5.0 and especially from 0.05 to 0.5.

To prepare the polymerization catalyst the solid catalyst component is simply combined with organoaluminium compound, most suitably employing a molar ratio to produce in the final catalyst an atomic ratio of aluminium to titanium of from 1:1 to 150:1, and suitably from 10:1 to 150:1. The catalysts of this invention tend to exhibit very good activity at much lower Al:Ti ratios, e.g. below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti atomic ratios of 30:1 to 100:1 and especially of 50:1 to 80:1 will be found advantageous.

In a further aspect this invention is concerned with solid catalyst components having an improved morphology, in particular a narrow particle size distribution. Thereto this invention provides a novel process for preparing the magnesium di-(3-halo- or 3-alkoxy phenoxide) starting materials set out hereinbefore. This novel process comprises the contacting of a magnesium-dialkoxide with a 3-halo- or 3-$C_1$ to $C_8$-alkoxy phenol in liquid phase and removing liberated alkanol from the reaction mixture by distillation.

It will be clear that this novel process is based on the principle of ligand exchange in line with the schematic reaction scheme

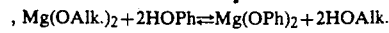

$$Mg(OAlk.)_2 + 2HOPh \rightleftharpoons Mg(OPh)_2 + 2HOAlk.$$

in which Ph stands for 3-halo or 3-$C_1$ to $C_8$ alkoxyphenyl. Alk. will normally stand for an alkyl group having 1 to 8 carbon atoms.

The liquid phase will preferably comprise a liquid hydrocarbon that may form an azeotrope with the alkanol to be removed. Preferred hydrocarbons are benzene, xylene, toluene, cumene, ethyl benzene, isopar E and petroleum ether. When employing magnesium diethoxide starting material, the alkanol to be removed is ethanol and this is the preferred embodiment of the novel ligand exchange process. Other magnesium alkoxides that may suitably be employed are isopropoxides, n-butoxides, isobutoxide and amyloxides.

The ligand exchange proceeds under stirring for periods that can be varied within the range of from 0.2 to 40 hours, typically from 10–20 hours. There is no need to employ magnesium compound starting material of controlled morphology. The preparation of $Mg(OPh)_2$ having controlled (spheroidal) particle morphology and narrow particle size distribution can be effected by a procedure in which the $Mg(OAlk)_2$ starting material is added in a gradual and controlled manner to a refluxing mixture of the phenol and a suitable solvent, preferably an aromatic solvent such as toluene, ethylbenzene or xylene. The preparation of controlled-morphology $Mg(OPh)_2$ in this manner is one of the surprising features of this invention.

The narrow particle size distribution of the monosubstituted magnesium-phenoxide so produced is maintained in the subsequent synthesis of the solid catalyst component of this invention. In its turn, the improved morphology of the solid catalyst component is transferred to the morphology of the olefin polymer, in accordance with the well known replica principle (cf. L. Luciani l.c. Improved polymer morphology is important in view of the absence of very fine, dusting polymer particles and of improved reactor loadings during the olefin polymerization process.

The present invention is also concerned with a process for polymerizing an alkene, preferably a 1-alkene, such as butylene or more preferably propylene. These polymerizations may be carried out by any of the conventional techniques, such as gas phase polymerization or slurry polymerization using liquid monomer or an inert hydrocarbon diluent as liquid medium.

The performance of the catalysts of this invention can be further improved by effecting one or more of the following modifications in the recipe for preparing the relevant solid catalyst components, each of such modifications being known per se:

1. subjecting the solid catalyst component, at the end of its preparation process, to contacting with a carboxylic acid halide, such as phthaloylchloride or benzoylchloride, 2. subjecting the solid catalyst component at the end of its preparation process to contacting with a dialkyl aluminium halide, such as diethylaluminiumchloride and 3. subjecting the solid catalyst component or the polymerization catalyst to prepolymerization in order to further improve the bulk density of polymer obtainable in a slurry polymerization process.

EXAMPLES a) Magnesium di-(3-methoxyphenoxide) (6.76 g, 25 mmol) is mixed at 20° C. with titanium tetrachloride (13.72 ml, 125 mmol), ethylbenzoate (0.63 ml, 4.4 mmol) and 61.28 ml monochlorobenzene. The stirred mixture is heated in 20 min to 100° C. and kept at that temperature for 1 hour. The liquid phase is removed by hot filtration and the solid catalyst component so obtained is washed six times with 75 ml portions of isooctane at 30°to 36°C. The solid catalyst component (component a) contained magnesium and chlorine in an atomic ratio of at least 1:1.75.

b) The total of component a) as obtained in Example a) was suspended in 13.72 ml titanium tetrachloride (125 mmol) and 61.28 ml monochlorobenzene at 100° C. and the suspension was stirred at that temperature for 0.5 hours. The solid was isolated from the reaction mixture and washed six times with iso-octane to obtain component b).

c) (Comparative Example) Example a) was substantially repeated with the difference that magnesium di(2-methoxyphenoxide) was used in stead of magnesium di(3-methoxyphenoxide). The magnesium di(2-methoxyphenoxide) was prepared by reaction of magnesium diethoxide with 2-methoxyphenol using the procedure as descibed in Example g). The solid obtained will hereinafter be referred to as component c).

d) Comparative Example a) was substantially repeated with the difference that magnesium di(4-methoxyphenoxide) was used in stead of magnesium di(3-methoxyphenoxide). The magnesium di(4-methoxyphenoxide) was prepared by reaction of magnesium diethoxide with 4-methoxyphenol using the procedure as descibed in Example g). The solid obtained will hereinafter be referred to as component d).

e) Propylene was polymerized in a liquid bulk process under the following conditions: T 67° C., time 1 hr, pressure 700 kpa, TEA/Ti molar ratio 80:1, DEAC/Ti molar ratio 20:1, TEA/PEEB ratio 1.8:1, $H_2$ concentration 1-1.5% vol in gas cap. (TEA = triethyl-aluminium, DEAC = diethylalumiumchloride, PEEB = ethyl p.ethoxy benzoate).

The table shows the bulk density (BD), the yield and the xylene solubles content (XS) of the polymers obtained in polymerization runs using the components a), b), c) and d).

| Component | Yield of polypropylene kg/g | XS % w | BD w/ml |
|---|---|---|---|
| a) | 41.5 | 3.2 | 0.39 |
| b) | 50.0 | 3.6 | 0.40 |
| c)* | 6.2 | 7.4 | 0.29 |
| d)* | 22.4 | 5.5 | 0.30 |

*Comparative Example.

f) A vessel, equipped with a propeller stirrer and a Dean and Stark apparatus, was charged with 280 g petroleum ether 100–140 and 25.6 g (206.2 mmol) 3-methoxyphenol. The mixture was heated to 80° C., after which 11.5 g (100.5 mmol) Mg(OEt)$_2$ was added, causing an exothermic reaction. The mixture was heated to reflux temperature, and an ethanol/petroleum ether mixture was distilled off until ethanol could no longer be detected in the distillate. The total weight of distillate amounted to 108 g (=1.07 g/mmol Mg(OEt)$_2$) After cooling, the solids were separated from the mother liquor by filtration, washed twice with petroleum ether, and dried under moving nitrogen.

Analysis (GLC and titrimetric) indicated a 3-methoxyphenol/Mg ratio of 2.05/1, residual ethoxide was negligible or absent (below GLC detection limit).

g) A 500 ml reactor equipped with an anchor stirrer and a Dean and Stark apparatus, was charged with 400 ml toluene respectively ethybenzene and 27 ml (250 mmol) 3-methoxyphenol. Stirring was started and the mixture was heated to reflux temperature to start the distillation. Then 11.44 g (100 mmol) Mg(OEt)$_2$ was added in 5 portions of ±2.3 g. After the first addition, subsequent portions were added only after the initial concentration of ethanol in the distillate had diminished by ±90%. The total reaction volume was kept constant by addition of toluene. After the last addition, distillation was continued until ethanol could no longer be detected in the distillate, the total weight of distillate amounting to 1084 g (=10.84 g/mmol Mg(OEt)2). The mixture was cooled to 80° C., stirring was stopped and after the solids had settled, the mother liquor was decanted. The product was washed four times with iso-octane (200 ml, 80° C.) and dried under a stream of nitrogen (25°C.). According to SEM photos, spheroidal particles had been formed.

The table shows the bulk density (B.D.), the polymer yield, xylene solubles (XS) and intrinsic viscosity (LVN) obtained in polymerization runs under the conditions set out in e) above, with solid catalyst components produced following recipe a) above from magnesium compounds as obtained along the recipes disclosed in f) and g) above.

| Solvent | Yield of polypropylene kg/g | XS % w | LVN dl/g | B.D. g/ml |
|---|---|---|---|---|
| Petroleumether* | 37.8 | 3.1 | 2.84 | 0.38 |
| Toluene* | 41.0 | 3.3 | 2.44 | 0.38 |
| Toluene** | 46.9 | 3.7 | 2.72 | 0.42 |
| Ethylbenzene** | 43.0 | 3.2 | 2.68 | 0.42 |

*Solid cat. component prepared as per item f)
**Solid cat. component prepared as per item g), azeotropic distillation for ethanol/toluene, zeotropic distillation for ethanol/ethylbenzene

We claim:

1. A process for the polymerization of an olefin comprising polymerizing said olefin under olefin polymerization conditions in the presence of a polymerization catalyst prepared by the method comprising halogenating a magnesium-di-(3-halo- or 3-$C_1$ to $C_8$ alkoxy-phenoxide) with a halide of tetravalent titanium in the presence of a halohydrocarbon, recovering the solid reaction product from the reaction mixture and combining the solid reaction product with an organo aluminum compound and an electron donor.

2. A process as claimed inn claim 1 in which the magnesium diphenoxide is a magnesium-di(3-$C_1$ to $C_8$ alkoxy-phenoxide).

3. A process as claimed in claim 2 in which the halogenating is effected in the presence of an electron donor.

4. A process as claimed in claim 3 wherein the electron donor for the solid catalyst component is an alkyl ester of an aromatic carboxylic acid.

5. A process as claimed in claim 3 wherein the electron donor for the organo aluminium compound is a dialkyl dialkyl silane, an alkyl trialkoxy silane or an alkylester of an aromatic carboxylic acid.

* * * * *

UNITED STATES PATENT AND TRADEMARK OFFICE
CERTIFICATE OF CORRECTION

PATENT NO. : 5,145,922

DATED : September 8, 1992

INVENTOR(S) : ALAN VILLENA ET AL.

It is certified that error appears in the above-identified patent and that said Letters Patent is hereby corrected as shown below:

Column 6, in Claim 2, line 1 of the claim, "inn" should read --in--.

In Claim 5, line 3 of the claim, "dialkyl dialkyl silane" should read --dialkyl dialkoxy silane--.

Signed and Sealed this

Fourteenth Day of September, 1993

*Attest:*

BRUCE LEHMAN

*Attesting Officer*  *Commissioner of Patents and Trademarks*